(12) United States Patent
Weber

(10) Patent No.: US 10,046,741 B2
(45) Date of Patent: Aug. 14, 2018

(54) SUPPORT DEVICE

(71) Applicant: SAF-HOLLAND GmbH, Bessenbach (DE)

(72) Inventor: Elmar Weber, Dülmen (DE)

(73) Assignee: SAF-HOLLAND GmbH, Bessenbach (DE)

(*) Notice: Subject to any disclaimer, the term of this patent is extended or adjusted under 35 U.S.C. 154(b) by 134 days.

(21) Appl. No.: 14/898,667

(22) PCT Filed: Jun. 11, 2014

(86) PCT No.: PCT/EP2014/062098
§ 371 (c)(1),
(2) Date: Dec. 15, 2015

(87) PCT Pub. No.: WO2014/206730
PCT Pub. Date: Dec. 31, 2014

(65) Prior Publication Data
US 2016/0129891 A1    May 12, 2016

(30) Foreign Application Priority Data
Jun. 28, 2013  (DE) .................. 10 2013 212 572

(51) Int. Cl.
*B60S 9/02* (2006.01)
*B60S 9/04* (2006.01)
*B60S 9/12* (2006.01)
*B60S 9/10* (2006.01)

(52) U.S. Cl.
CPC . *B60S 9/02* (2013.01); *B60S 9/04* (2013.01); *B60S 9/10* (2013.01); *B60S 9/12* (2013.01)

(58) Field of Classification Search
CPC ...... B60S 9/02; B60S 9/04; B60S 9/10; B60S 9/12
See application file for complete search history.

(56) References Cited

U.S. PATENT DOCUMENTS

| | | |
|---|---|---|
| 3,219,362 A | 11/1965 | Epstein |
| 3,754,777 A | 8/1973 | Riggs et al. |
| 4,268,066 A * | 5/1981 | Davis ................ B60S 9/06 248/352 |

(Continued)

FOREIGN PATENT DOCUMENTS

| | | |
|---|---|---|
| CN | 202703544 | 1/2013 |
| DE | 69020116 | 9/1995 |

(Continued)

OTHER PUBLICATIONS

European Patent Office, International Search Report, dated Jul. 4, 2014.

*Primary Examiner* — Joseph M Rocca
*Assistant Examiner* — Marlon A Arce
(74) *Attorney, Agent, or Firm* — Price Heneveld LLP

(57) ABSTRACT

A support device for a vehicle includes a support foot configured to place on a base and a support unit connected to the support foot. The support unit includes a tubular support element. The support foot includes a plate-shaped bearing element. The plate-shaped bearing element includes an engagement contour on at least one outer face, a support unit of another support device being attachable to said engagement contour in order to secure against a lateral displacement.

12 Claims, 2 Drawing Sheets

(56) References Cited

U.S. PATENT DOCUMENTS

| | | | | |
|---|---|---|---|---|
| 2002/0036403 | A1 | 3/2002 | Lagsdin | |
| 2004/0178617 | A1 | 9/2004 | Lagsdin | |
| 2006/0081755 | A1* | 4/2006 | Thorpe | B60S 9/06 |
| | | | | 248/354.1 |
| 2007/0152203 | A1* | 7/2007 | Green | B60S 9/22 |
| | | | | 254/420 |
| 2008/0217898 | A1 | 9/2008 | Hanscom | |
| 2014/0353942 | A1* | 12/2014 | Armstrong | B60D 1/66 |
| | | | | 280/475 |

FOREIGN PATENT DOCUMENTS

| | | |
|---|---|---|
| EP | 0163621 | 12/1985 |
| GB | 2352699 | 2/2001 |

* cited by examiner

SUPPORT DEVICE

BACKGROUND OF THE INVENTION

The invention relates to a support device for supporting a vehicle, in particular a semi-trailer.

Such support devices are known in the prior art and serve in particular to support a semi-trailer when the latter is to be unhitched from the tractor and be parked separately. The support devices then take on to support the semi-trailer in the front area. The support devices are usually attached to a frame of the semi-trailer, and in most cases arranged in pairs on the left-hand side and on the right-hand side in a front area of the trailer.

In order to lift the vehicle, the support devices are usually adjustable in height. To this end, for example a telescopic support tube may be provided, on which a support foot is pivotably mounted.

In order to be able to transmit the supporting force into the ground over an area, which is as large as is possible, the support feet of such support devices often comprise ground contact plates, which have a considerably larger cross-section than the telescopic support tube. This results in a design of the support device, which might be disadvantageous during transport.

Known support devices are usually transported on pallets. Here, several support devices are stacked one upon the other horizontally. Due to the irregular outer contour, intermediate layers, made from wood or polystyrene, for example, are put between the individual support winches in order to compensate for the irregular outer contour and in order to make it possible to stably stack the devices. Said materials have to be disposed of or returned after transport.

The object underlying the invention is to provide a support device, which can be transported very easily.

SUMMARY OF THE INVENTION

According to the invention, the support device comprises a support foot with an essentially plate-shaped bearing element for placing onto a base or underground, and a support unit with a tubular support element, which is connected to the support foot. According to the invention, the plate-shaped bearing element of the support foot is provided with an engagement contour on at least one outer face, a support unit of a further support device being attachable to said engagement contour in such a manner to secure the further support device against a lateral displacement. A basic idea of the invention may be seen in providing at the outer edge of the contact plate of the support foot at least one form closure element, by means of which the support unit of a further support device may be attached to the support foot in order to attach two or more support devices stacked upon each other to each other such that a lateral displacement or slip of the support devices relative to each other is limited. Thus, it becomes possible to stack several support devices in a preferably horizontal or lying orientation without additional elements being necessary in order to support or fix the support device. The invention makes it thus possible to stack support devices easily and at the same time safely, wherein an inexpensive and resource-saving transport may be realized, due to the fact that it is possible to do without further transport parts between the individual support devices. In the present case, engagement contour means in particular a contour of the support foot, which has projections and/or recesses, by means of which a movement of the supported support unit relative to the support foot may be limited. Here, in particular a movement in the lateral direction, i.e. transverse to the longitudinal axis of the tubular support element, is limited, wherein preferably a lateral movement of the stacked support devices relative to each other is avoided to a large extent. Due to the engagement contour formed on the outer face or outer edge of the support foot, in particular limit stops are formed, limiting the movement of the support unit to be supported. The tubular support element, which may also be referred to as support tube, is telescopic in a preferred embodiment and comprises an outer tube as well as an inner tube guided thereon in such a manner that it is longitudinally movable. Preferably, the support foot is attached to the inner tube. The outer tube is preferably mounted on the vehicle to be supported, wherein to this end a respective fixing device may be provided on the outer tube. The fixing device may comprise in particular a plate-shaped fixing or flange element, having one or more holes serving in particular to accommodate screws/bolts or other fixing elements. The plate-shaped fixing element, which may also be referred to as mounting or fixing plate, extends preferably in the longitudinal direction of the support tube, i.e. transverse to the base plate of the support foot.

Several support devices may be stacked in a particularly space-saving manner in that the engagement contour has a cavity or recess in the plate-shaped bearing element, in which the support unit of the further support device may be accommodated. The support unit of the support device to be supported is guided in the longitudinal direction by the recess formed in the outer edge of the foot plate, and in this way it is secured against a lateral displacement.

With regard to a flexible adaption to the vehicle to be supported it is preferred that the support unit is connected to the support foot such that it is releasable and/or replaceable. In this manner, one and the same support foot may be combined with different support units, for example.

Against this background, it is according to the invention preferred that the recess in the plate-shaped bearing element of the support foot has a stepped contour, by means of which at least two recess areas are formed, in order to accommodate differently shaped and/or dimensioned support units. Thus, different support units may be attached to or guided on the support foot.

In a further preferred embodiment, the engagement contour has an engagement element for engaging into an opening, in particular a hole or a recess, of the support unit to be fixed. The engagement element, which may be in particular a projection or rise formed on the plate-shaped bearing element, keeps the support unit to be supported in its position and, in particular in connection with a hole formed on the support unit, may also ensure a fixing in the longitudinal direction in addition to the lateral fixing.

According to the invention, it is particularly preferred that the engagement contour is formed and dimensioned to attach and/or accommodate a tubular support element and/or a mounting plate of the further support device.

To this end, the engagement contour or the recess preferably has a width corresponding to the width of the support tube and/or of the mounting plate of the support device to be stacked. As regards its position, size and shape, an engagement element, which is possibly present, is adapted to a corresponding cavity or hole in the support element or in the mounting plate.

The engagement contour may be formed and dimensioned in particular in order to attach and/or accommodate a support unit, which is similar to the own support unit. Here, it is preferred that the engagement contour is suitable to attach and/or accommodate a support unit corresponding with regard to shape and size to the support unit of the support device of the invention. To this end, for example the width of the recess is adapted to the outer dimensions, i.e. the outer width of the support element and/or of the mounting plate. As regards their position, shape and size, possibly present engagement elements are adapted to corresponding engagement areas of the support element and/or of the mounting plate.

Preferably, the engagement contour has a recess with a width corresponding to a cross-sectional width of the tubular support element and/or a width of the mounting plate or of the mounting flange. The tubular support element preferably has a rectangular cross-section. Cross-sectional width means in particular the outer cross-section of the support element.

With regard to possibly present irregularities of the floor, it is preferred that the support foot is pivotably attached to the support unit. Here, the engagement contour is preferably formed on an outer face or outer edge of the plate-shaped bearing element running transverse, in particular perpendicular to a swivel axis, along which the support foot is pivotably mounted on the support unit. When the support foot touches down onto the ground, such an outer edge is subject to a smaller load than the outer edges running parallel to the swivel axis.

In a further preferred embodiment of the invention, the plate-shaped bearing element of the support foot is provided on at least two opposite outer faces with a rolling area, which may be formed in particular by a chamfer of the bearing element. The chamfers protect the bearing element when it touches down onto the ground, in case it is not oriented completely parallel to the ground when it touches down onto the ground, and to this end the chamfers are formed in particular on the outer faces of the preferably rectangular bearing element, which outer faces run parallel to the swivel axis.

In order not to impair said sensitive outer areas of the bearing plate, it is preferred that the engagement contour be formed on an outer face of the bearing element, which runs transverse to the outer faces or outer edges provided with a rolling area.

In order to make it possible to stack more than two support devices, according to the invention, it is preferred that the plate-shaped bearing element has at least two engagement contours, formed on opposite outer faces or outer edges of the plate-shaped bearing element. The engagement contours in the outer faces or outer edges, which are opposite each other and which run preferably parallel to each other, are preferably formed the same or identical.

In a further aspect, the invention relates to an arrangement of at least two support devices according to the invention, which each have a support foot for touching down onto the ground, and a support unit connected to the support foot. The support unit of each support device comprises a tubular support element. The support foot comprises a plate-shaped bearing element. The plate-shaped bearing element of each of the at least two support devices is provided on at least one outer face or outer edge with an engagement contour, to which the support unit of the respective other support device may be attached in order to secure against a lateral displacement. In this way, it is possible to easily and safely stack at least two support devices, in particular for transport purposes.

The two support devices are formed preferably similar or identical. In the stacked state, the support devices are preferably in a lying orientation, in which the longitudinal axis of the support tube runs approximately horizontal.

Support devices, which are directly one above the other, are preferably rotated relative to each other by 180° about a vertical axis so that a respective upper area of the support tube rests against the support foot of the respective adjacent support device.

BRIEF DESCRIPTION OF THE DRAWINGS

The invention will be further described hereinafter with the help of exemplary embodiments shown in the appended Figures. The Figures show.

DETAILED DESCRIPTION OF THE PREFERRED EMBODIMENTS

Similar components or components acting in the same manner are denoted by the same reference signs in all Figures.

Figure 1:
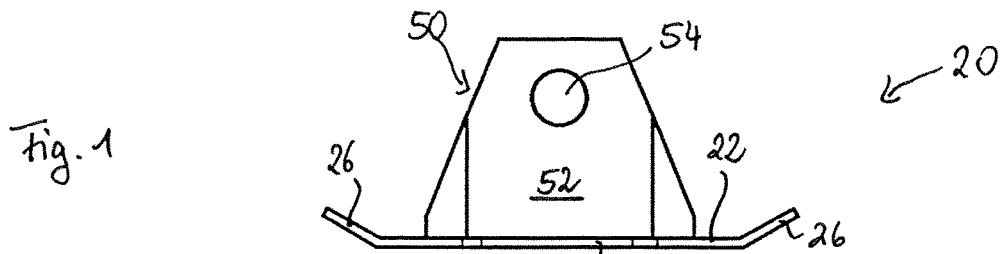
FIG. 1 shows a side view of a support foot according to the invention.
Figure 2:
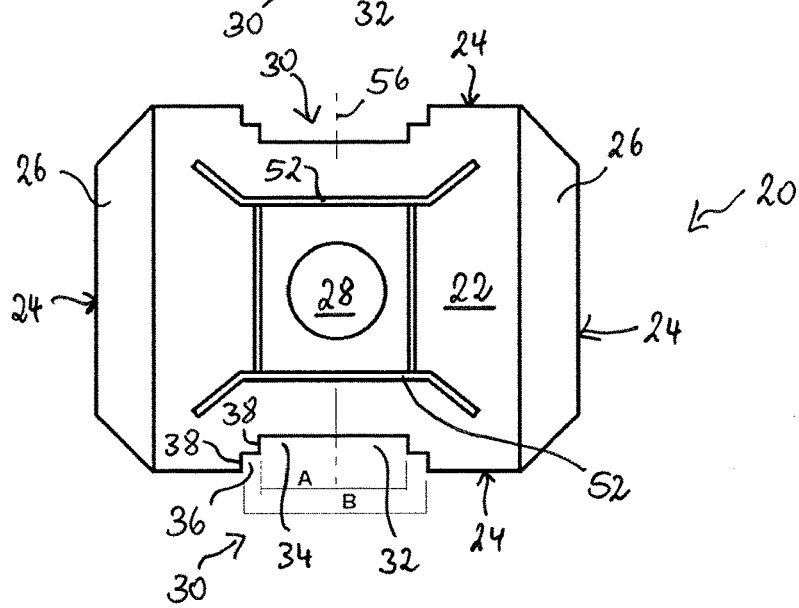
FIG. 2 shows a view from above of the support foot of FIG. 1.

A first embodiment of a support foot 20 of a support device 10 according to the invention, which may also be referred to as support winch, is shown in FIGS. 1 and 2. The support foot 20 comprises a plate-shaped bearing element 22 with a plane or flat, preferably rectangular contact surface to the ground, and may also be referred to as contact plate or foot plate. The bearing element 22 is designed as an essentially rectangular plate provided on at least two outer edges or outer faces 24 with a rolling area 26, which is formed by bending or chamfering the plate. The bearing element 22 has two opposite rolling areas 26 in the embodiment shown.

Above the plate-shaped bearing element 22, a bearing area 50 is provided, on which a support unit 60 may be pivotably mounted. The bearing area 50 comprises one or more bearing plates 52 oriented transverse to the base plate, in which bearing lugs 54 for accommodating a bearing pin are formed. The bearing lugs 54 and the bearing pin, respectively, form a swivel axis 56, along which the support unit 60 may be pivotably mounted with respect to the support foot 20. The support foot may be manufactured by welding, casting or forming, for example, and be designed as a so-called "sand shoe" or compensation foot.

In the bearing element 22, between the bearing plates 52, an access opening 28 is formed, providing access to a support element 62 fixed to the support foot 20. The access opening 28 is preferably arranged centrally in the contact surface and provided in particular to ensure a lubricant exchange. The diameter of the preferably round access opening 28 is preferably between 40 and 100 mm, further preferably between 45 and 80 mm, and most preferably between 50 and 75 mm.

At two opposite outer faces 24 of the bearing element 22, engagement contours 30 are formed, which are provided to accommodate, guide and/or attach a support unit 60 of a further support device 10. The opposing engagement contours 30 are designed similar or identical. Generally, it is also possible to provide shapings on all outer faces of the bearing element 22, which support the stacking. Exemplary embodiments of an engagement contour 30 will be described in the following with reference to FIGS. 2 to 4. The features of the individual embodiments may also be combined with each other.

Figure 3:
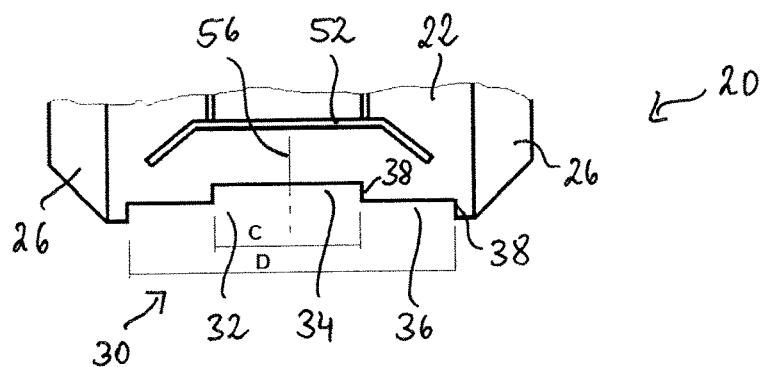
FIG. 3 shows a view from above of a further embodiment of a support foot according to the invention.
Figure 4:
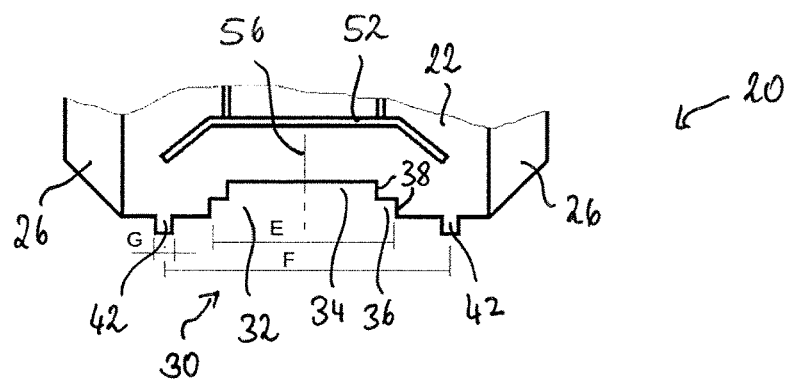
FIG. 4 shows a view from above of a further embodiment of a support foot according to the invention.

According to the embodiments of FIGS. 2 to 4, the engagement contour 30 comprises a recess 32 in the outer edge or outer face 24 of the bearing element 22. Due to the recess 32, lateral limit stops 38 are formed limiting a lateral movement of a support unit 60 arranged in the recess 32 and thus fixing the support unit 60 in the lateral direction.

The lateral edges of the recess 32 are designed stepped in the embodiments shown so that several differently dimensioned recess sections or areas 34, 36 form with limit stops 38, which are displaced relative to each other, the recess sections being provided to accommodate different support units 60. According to FIG. 2, a deeper, first recess area 34 has a width A, and a flatter, second recess area 36 has a larger width B, wherein the widths A and B are adapted to an outer cross-section of the support unit 60 to be accommodated, and in particular may be designed a few centimeters larger than the outer dimensions of the support unit 60.

Preferred nominal dimensions of the support area formed by the recess 32 are in a range of 100 to 150 mm, wherein dimensions of about 110 mm, 126 mm and 133 mm are particularly preferred.

The embodiment according to FIG. 3 is suitable either for supporting a tubular support element 62, namely preferably in the deeper recess area 34 with the width C, or for supporting a mounting plate 74 having a larger width than the support element 62, namely in the flatter recess area 36 with the larger width D. The nominal dimension C may correspond to the nominal dimension A from FIG. 2. Wherein the shape may be chosen in particular such that all nominal dimensions work. The width D of the second recess area 36 is preferably between 210 and 250 mm, wherein a dimension of about 230 mm is particularly preferred.

FIG. 4 shows an embodiment, in which, on the outer edge of the bearing element 22, in addition to the support area formed by the recess 32, a further support area is formed, on which one or more engagement elements 42 in the form of projections or rises are formed. In this way, the support foot 20 may rest against a mounting plate 74, wherein the engagement elements 42 engage into bores of the mounting plate 74, thus fixing the mounting plate 74. The distance F between two projections or engagement elements 42 is preferably in a range between 180 mm and 200 mm, wherein a distance of about 190 mm is particularly preferred. The transverse extension or width G of the engagement elements 42 is preferably between 12 and 17 mm, further preferably between 13 and 16 mm, and most preferably between 15 and 16 mm. The engagement elements 42 preferably protrude from the contour of the outer face 24 of the bearing element 22, but they may also be arranged in the area of the recess 32.

Figure 5:
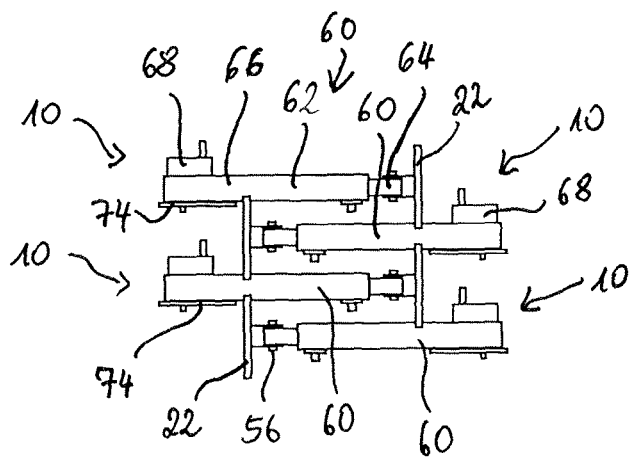
FIG. 5 shows a first embodiment of an arrangement of stacked support devices.
Figure 6:
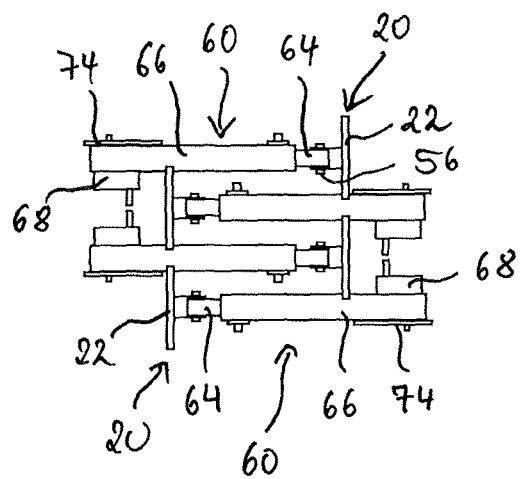
FIG. 6 shows a second embodiment of an arrangement of stacked support devices.
Figure 7:
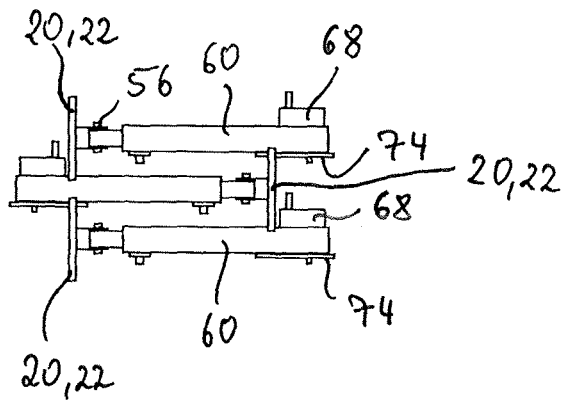
FIG. 7 shows a third embodiment of an arrangement of stacked support devices.

FIGS. 5 to 7 show different arrangements of stacked support devices 10. Each of the in particular similar support devices 10 comprises a support foot 20, on which a support unit 60 is mounted pivotably about a swivel axis 56. The support unit 60 comprises a tubular or rod-shaped support element 62 or support tube, on which a mounting plate 74 or a mounting flange is arranged. The tubular support element 62 has a rectangular cross-section. The mounting plate 74 or the mounting flange serves for attaching the support device 10 to a vehicle and is arranged at the end of the support tube opposite of the support foot 20. The mounting plate 74 protrudes laterally beyond the tubular support element 62. In this protruding area, in the mounting plate 74, bores are formed, which serve to accommodate bolts/screws or the like.

The tubular support element 62 comprises an inner tube 64 and an outer tube 66 guided thereon such that it is telescopic or movable in the longitudinal direction. The inner tube 64 is connected to the support foot 20. The mounting plate 74 is attached to the outer tube 66. Opposite of the mounting plate 74, there is an actuating unit 68 with input and output shafts for driving and being driven, by means of which the support element 62 telescopes, i.e. the inner tube 64 may be moved relative to the outer tube 66.

The individual, stacked support devices 10 are horizontally arranged and alternatingly rotated relative to each other by 180° about a vertical axis of rotation. The mounting plates 74 of the support devices 10 are arranged in a horizontal plane. Each of the plate-shaped bearing elements 22 of the support devices 10 rests against a support unit 60 of an adjacent support device 10, wherein they are supported along a support area formed on the outer edge of the bearing element 22. The support area is formed by the recess 32 formed in the outer edge, and/or is made in an edge area provided with a protruding engagement element 42.

The individual support devices 10 are all arranged in the same direction in the stacking shown in FIG. 5, i.e. the mounting plates 74 or the actuating units 68 all point either to the top or to the bottom. The support foot 20 rests against the respective outer tube 66 of an adjacent support element 62, or the outer tube 66 rests against the support foot 20 of an adjacent support device 10.

Different from the stacking shown in FIG. 5, the support devices 10 of the embodiment shown in FIG. 6 are stacked such that the respective actuating units 68 or the mounting plates 74 of two support devices oriented in the same direction face each other.

A particularly compact stacking is shown in FIG. 7. Here, the support feet 20 rest against a mounting plate 74 of an adjacent support device 10, wherein to this end the engagement contours 30 according to FIG. 3 or 4 may be provided, for example.

In sum, the invention provides a support device, which may be stacked particularly easily, allowing for an inexpensive transport.

LIST OF REFERENCE SIGNS 10 support device
20 support foot
22 plate-shaped bearing element
24 outer face
26 rolling area
28 access opening
30 engagement contour
32 recess
34 first recess area
36 second recess area
38 limit stop
42 engagement element
52 bearing plate
54 bearing lug
56 swivel axis
60 support unit
62 support element
64 inner tube
66 outer tube 68 actuating unit
74 mounting plate

The invention claimed is:

1. A support arrangement for a vehicle comprising:
a first support device, comprising:
   a support foot configured to place on a base; and
   a first support unit connected to the support foot;
   wherein the first support unit comprises a first tubular support element;
   wherein the support foot comprises a plate-shaped bearing element;
   wherein the plate-shaped bearing element includes an engagement contour on at least one outer face;
a second support device comprising:
   a second support unit engaging the engagement contour of the bearing element to secure against a lateral displacement;
wherein the engagement contour is configured and dimensioned to attach and/or accommodate the second support unit configured similar to the first support unit;
wherein the engagement contour has a recess in the plate-shaped bearing element, in which the second support unit of the second support device engages; and
wherein the recess has a stepped contour, forming at least two recess areas for accommodating differently configured and/or dimensioned support units.

2. The support arrangement of claim 1, wherein the engagement contour has an engagement element for engaging into a cavity of the second support unit.

3. The support arrangement of claim 2, wherein the engagement contour is configured and dimensioned to attach and/or accommodate the second support element and/or a mounting plate of the second support device, and wherein the second support element is tubular.

4. The support arrangement of claim 3, wherein the engagement contour is configured on an outer face of the plate-shaped bearing element, which outer face runs transverse to a swivel axis, along which the support foot is pivotably mounted on the second support unit.

5. The support arrangement of claim 4, wherein the engagement contour is configured on an outer face of the bearing element, which outer face runs transverse to outer faces or outer edges provided with a rolling area.

6. The support arrangement of claim 5, wherein the plate-shaped bearing element has at least two engagement contours formed on opposite outer faces of the plate-shaped bearing element.

7. The support arrangement of claim 1, wherein the engagement contour has an engagement element for engaging into a cavity of the second support unit.

8. The support arrangement of claim 1, wherein the engagement contour is configured and dimensioned to attach and/or accommodate the second support element and/or a mounting plate of the second support device, and wherein the second support element is tubular.

9. The support arrangement of claim 1, wherein the engagement contour is configured on an outer face of the plate-shaped bearing element, which outer face runs transverse to a swivel axis, along which the support foot is pivotably mounted on the second support unit.

10. The support arrangement of claim 1, wherein the engagement contour is configured on an outer face of the bearing element, which outer face runs transverse to outer faces or outer edges provided with a rolling area.

11. The support arrangement of claim 1, wherein the plate-shaped bearing element has at least two engagement contours formed on opposite outer faces of the plate-shaped bearing element.

12. A support arrangement for a vehicle comprising:
a first support device, comprising:
   a support foot configured to place on a base; and
   a first support unit connected to the support foot;
   wherein the first support unit comprises a first tubular support element;
   wherein the support foot comprises a plate-shaped bearing element;
   wherein the plate-shaped bearing element includes an engagement contour on at least one outer face;
a second support device comprising:
   a second support unit engaging the engagement contour of the bearing element to secure against a lateral displacement;
wherein the engagement contour is configured and dimensioned to attach and/or accommodate the second support unit configured similar to the first support unit;
wherein the engagement contour is configured and dimensioned to attach and/or accommodate the second support element and/or a mounting plate of the second support device, and wherein the second support element is tubular; and
wherein the engagement contour has a recess with a width corresponding to a cross-sectional width of the tubular support element and/or a width of the mounting plate.

* * * * *